(12) United States Patent
Saito et al.

(10) Patent No.: US 12,260,718 B2
(45) Date of Patent: Mar. 25, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Sho Saito, Saitama (JP); Atsushi Kawano, Tokyo (JP); Shinji Yamamoto, Kanagawa (JP); Akifumi Tanaka, Kanagawa (JP); Ichiko Mayuzumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 460 days.

(21) Appl. No.: 17/353,036

(22) Filed: Jun. 21, 2021

(65) Prior Publication Data

US 2021/0407265 A1    Dec. 30, 2021

(30) Foreign Application Priority Data

Jun. 30, 2020 (JP) ................. 2020-112960

(51) Int. Cl.
| | | |
|---|---|---|
| *G08B 13/196* | (2006.01) | |
| *G06V 20/20* | (2022.01) | |
| *G06V 20/52* | (2022.01) | |
| *G06V 40/10* | (2022.01) | |

(52) U.S. Cl.
CPC ....... *G08B 13/19613* (2013.01); *G06V 20/20* (2022.01); *G06V 20/52* (2022.01); *G06V 40/103* (2022.01); *G08B 13/19608* (2013.01)

(58) Field of Classification Search
CPC ........ G08B 13/19613; G08B 13/19608; G08B 13/19671; G06V 20/20; G06V 20/52; G06V 40/103
See application file for complete search history.

(56) References Cited

U.S. PATENT DOCUMENTS

| | | | | |
|---|---|---|---|---|
| 9,158,975 B2* | 10/2015 | Lipton | ............... | G08B 13/1968 |
| 2003/0107650 A1* | 6/2003 | Colmenarez | ........... | G06V 20/52 |
| | | | | 348/150 |
| 2010/0318566 A1* | 12/2010 | Yoshio | ............. | G08B 13/19671 |
| | | | | 707/774 |
| 2014/0244392 A1* | 8/2014 | Chang | ................. | G06Q 10/087 |
| | | | | 705/28 |
| 2015/0016798 A1* | 1/2015 | Fujimatsu | ............... | G06V 20/52 |
| | | | | 386/223 |
| 2015/0244992 A1* | 8/2015 | Buehler | ........... | G08B 13/19602 |
| | | | | 348/159 |

(Continued)

FOREIGN PATENT DOCUMENTS

| | | | |
|---|---|---|---|
| JP | 2008003753 A | | 1/2008 |
| JP | 2009284167 A | | 12/2009 |

(Continued)

*Primary Examiner* — Kathleen M Broughton
(74) *Attorney, Agent, or Firm* — Canon U.S.A., Inc., IP Division

(57) ABSTRACT

An image processing apparatus that outputs information about a specified product includes a detection unit configured to detect person information including a behavior history of a person detected from a video, and an output unit configured to output information about a product that meets a predetermined condition, based on the detected behavior history in the person information relating to a person to be retrieved.

14 Claims, 14 Drawing Sheets

(56) References Cited

U.S. PATENT DOCUMENTS

| | | | |
|---|---|---|---|
| 2017/0116572 A1* | 4/2017 | Natarajan | G06Q 10/0875 |
| 2018/0115749 A1* | 4/2018 | Toshiyuki | G08B 13/19613 |
| 2018/0239953 A1* | 8/2018 | Miwa | G08B 25/04 |
| 2019/0080277 A1* | 3/2019 | Trivelpiece | G06N 20/00 |
| 2019/0088096 A1* | 3/2019 | King | G08B 13/19665 |
| 2019/0213545 A1* | 7/2019 | Adato | G06T 7/13 |
| 2019/0259259 A1* | 8/2019 | Mullins | G08B 13/19682 |
| 2019/0304284 A1* | 10/2019 | Takeuchi | A61B 5/0013 |
| 2021/0042509 A1* | 2/2021 | Valiulla | G06N 20/00 |
| 2021/0174652 A1* | 6/2021 | Hirasawa | G08B 13/1968 |
| 2021/0183212 A1* | 6/2021 | Wen | G06Q 20/206 |
| 2021/0248885 A1* | 8/2021 | Huang | G06F 18/253 |

FOREIGN PATENT DOCUMENTS

| | | | |
|---|---|---|---|
| JP | 2014218313 A | * | 11/2014 |
| JP | 2017040982 A | | 2/2017 |
| JP | 2018173855 A | | 11/2018 |
| WO | WO-2017029779 A1 | * | 2/2017 |
| WO | 2018104999 A | | 6/2018 |

* cited by examiner

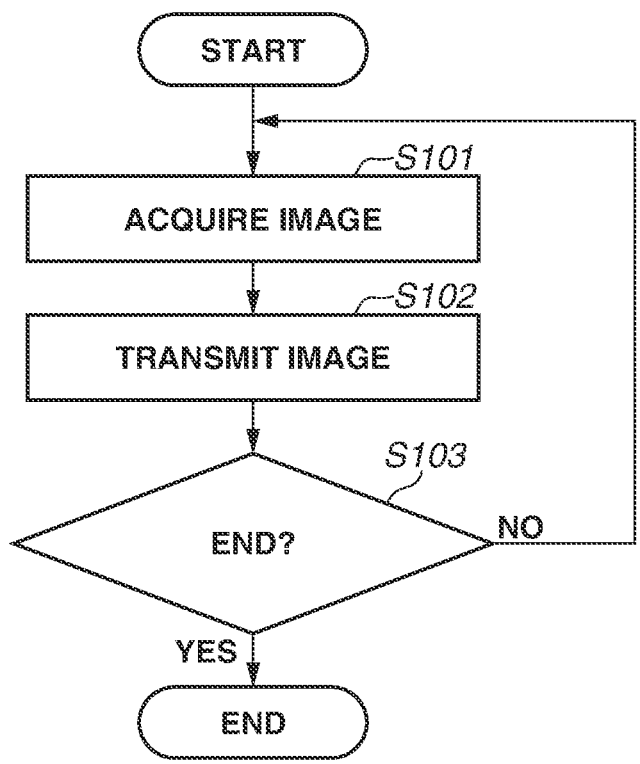

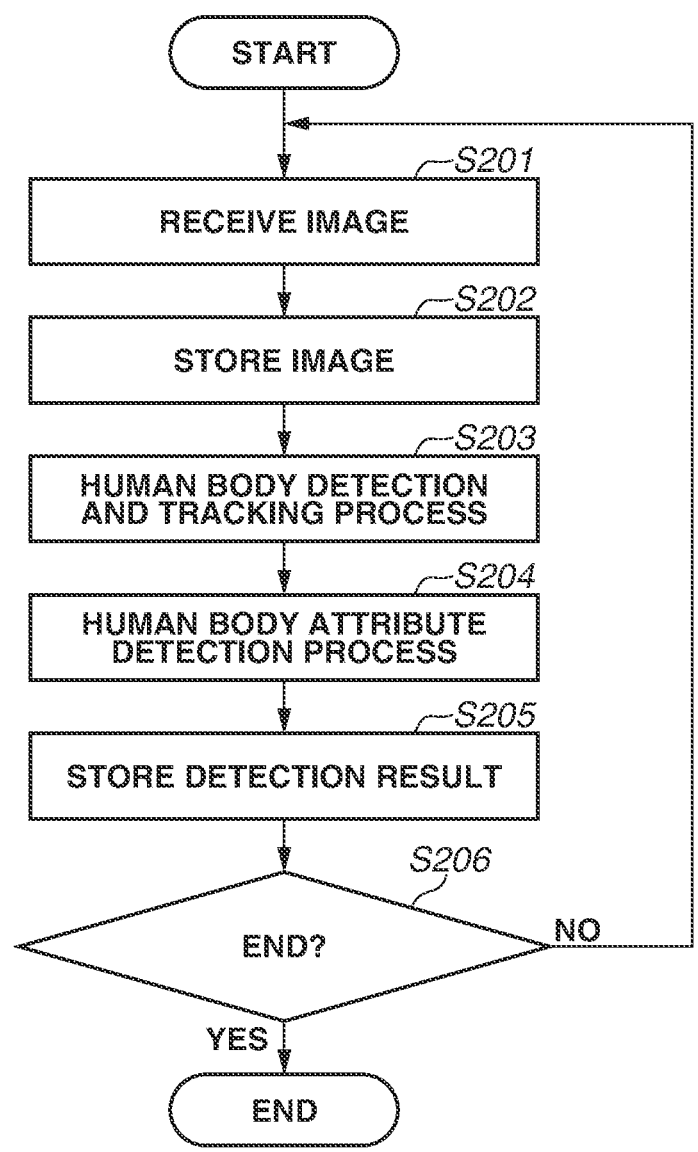

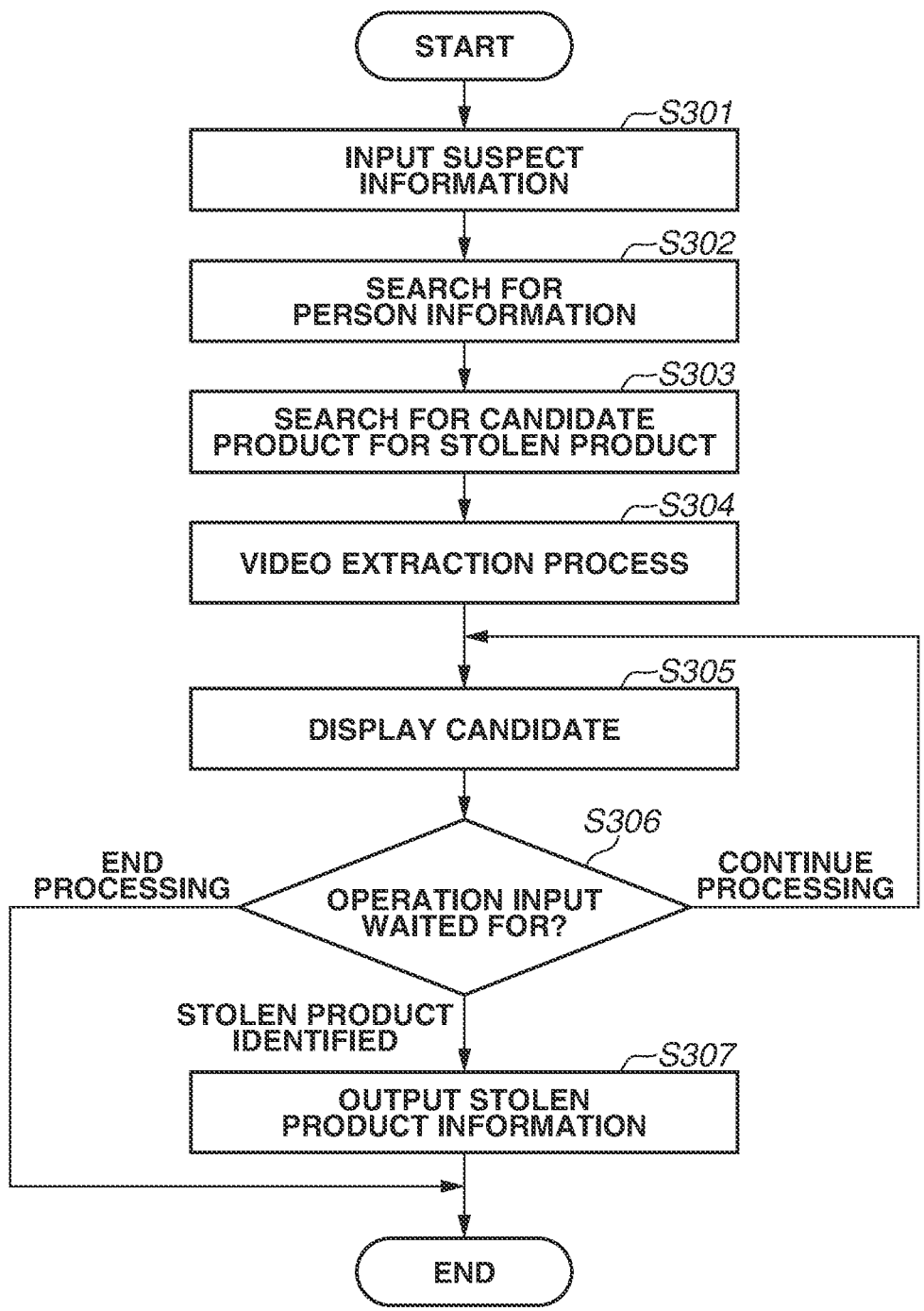

FIG.8

| DATE AND TIME | PRODUCT CODE | PRODUCT NAME | STORE SHELF NO. | QUANTITY OF STOCK | QUANTITY OF SALES | QUANTITY OF DISPOSAL |
|---|---|---|---|---|---|---|
| 2019/4/1 10:00 | A3924dsas | CAN OF Xxx JUICE | 5TH SHELF OF 4TH RACK | 100 | 0 | 0 |

FIG.9

| DATE AND TIME | PRODUCT CODE | PRODUCT NAME | STORE SHELF NO. | QUANTITY OF STOCK | QUANTITY OF SALES | QUANTITY OF DISPOSAL |
|---|---|---|---|---|---|---|
| 2019/5/3 18:00 | A3924dsas | CAN OF Xxx JUICE | 5TH SHELF OF 4TH RACK | 10 | 89 | 0 |

IMAGE PROCESSING APPARATUS, IMAGE PROCESSING METHOD, AND STORAGE MEDIUM

BACKGROUND

Field

The present disclosure relates to an image processing apparatus, an image processing method, and a storage medium.

Description of the Related Art

In recent years, monitoring systems have been increasingly introduced not only into large scale stores but also small scale ones for the purpose of security or prevention of losses arising from theft. Installation of a camera in a store has an effect of achieving security or preventing crimes to a degree, but such effect is becoming weak over time. For instance, it is frequent in a store that an insufficient quantity of stock is not noticed by when an inventory or shelf stocking is performed on the products in the store, that is to say, losses arising from theft is first revealed at that time. When the losses arising from theft have been revealed, a video having been recorded by a monitoring system is reproduced in order to confirm the losses arising from theft, which requires much time. In addition, the scene of theft has not always been recorded. It is therefore not infrequent that the store cannot find out a crime in spite of a long time investigation and gives up pursuit.

In order to facilitate such operations, Japanese Patent Application Laid-Open No. 2017-40982 discusses a method of chronologically displaying behaviors of a person recorded in a video, to specify a crime. In the method, features of the face, the whole body, and the like of a person are previously extracted from a person in a video captured with a monitor camera, and the video is searched based on a condition, such as images of the face and the whole body. It is stated that images are chronologically displayed based on the behavior of a person, so as to assist the search for a suspect.

The use of the search technology as discussed in Japanese Patent Application Laid-Open No. 2017-40982 makes it possible to extract a person that meets a condition, based on features of a subject. If, however, it is to be investigated whether a thief has stolen another product, it is required to visually confirm again, for each stolen product, that the extracted person exhibited a behavior such as picking up the relevant product and placing the product in a bag, which requires much operation time.

SUMMARY

The present disclosure has been made in order to promptly identify another stolen article stolen by the suspect.

According to an aspect of the present disclosure, an image processing apparatus that outputs information about a specified product includes a detection unit configured to detect person information including a behavior history of a person detected from a video, and an output unit configured to output information about a product that meets a predetermined condition, based on the detected behavior history in the person information relating to a person to be retrieved.

Further features of the present disclosure will become apparent from the following description of exemplary embodiments with reference to the attached drawings.

BRIEF DESCRIPTION OF THE DRAWINGS

FIG. 2 is a flowchart illustrating an example of an imaging processing procedure.

FIG. 3 is a flowchart illustrating an example of a recording and metadata storing processing procedure.

FIG. 4 is a flowchart illustrating an example of a stolen product extraction processing procedure.

FIG. 8 is a diagram illustrating an example of product stock information.

FIG. 9 is a diagram illustrating an example of the product stock information.

DESCRIPTION OF THE EMBODIMENTS

Figure 1A:
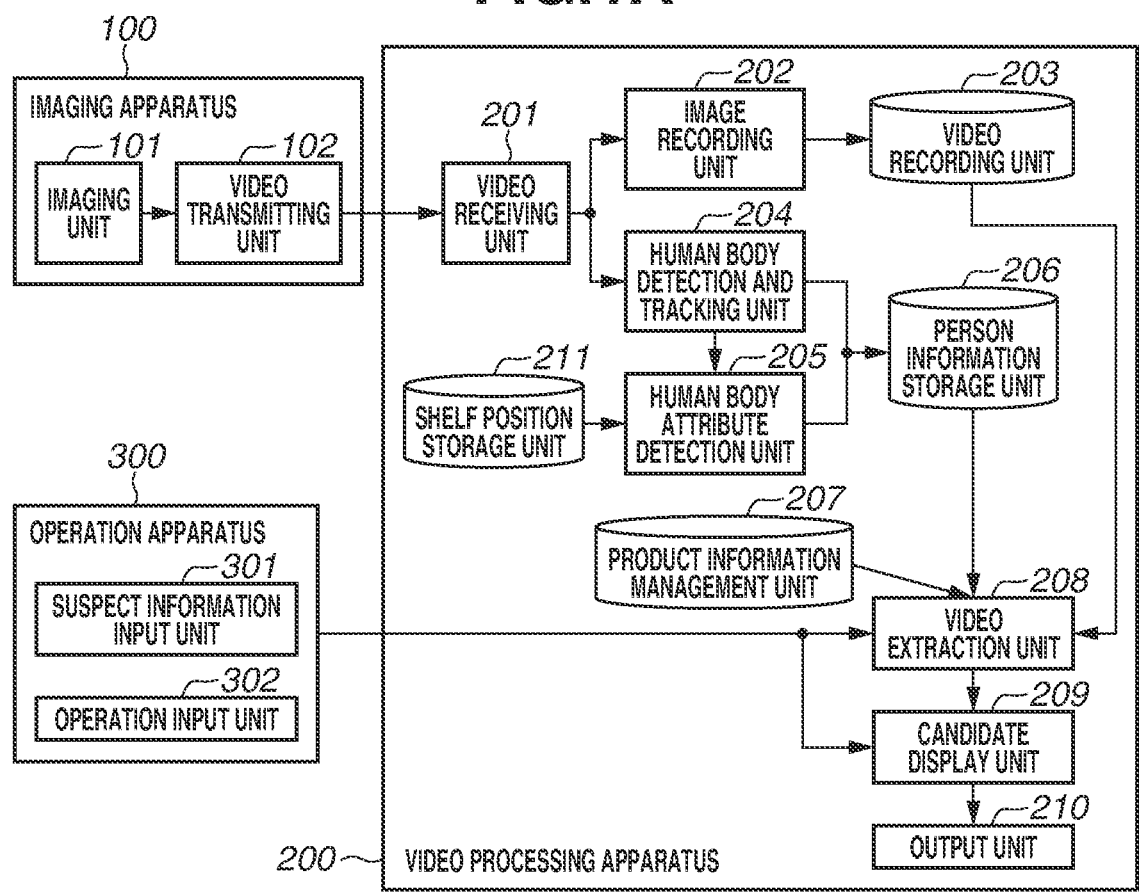
FIG. 1A is a block diagram illustrating an example of a system configuration of an image processing apparatus.
Figure 1B:
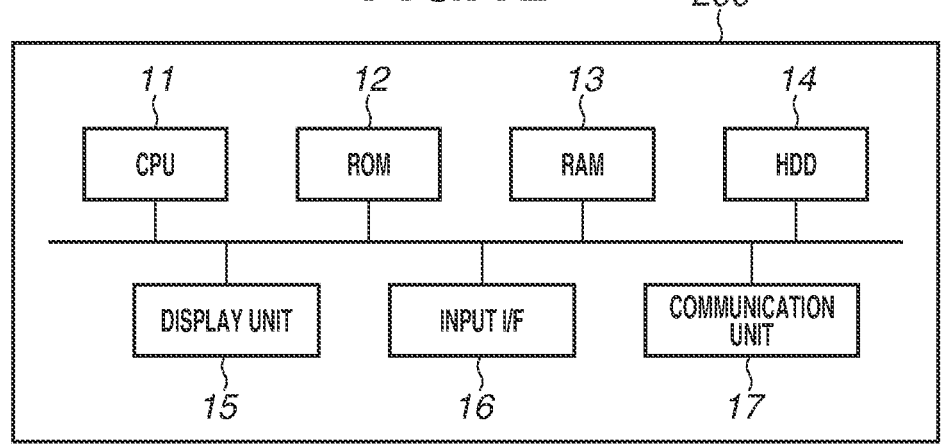
FIG. 1B is a block diagram illustrating an exemplary hardware configuration of an image processing apparatus.

A first exemplary embodiment of the present disclosure will be described below. In the present exemplary embodiment, a description will be provided of an exemplary monitoring system, in which cameras are installed in a retail store, such as a convenience store, to perform imaging and recording, and a report including an image in which a suspect has been captured is made if a theft has occurred.

An imaging apparatus 100 includes an imaging unit 101 and a video transmitting unit 102. The imaging unit 101 includes an imaging lens, an imaging sensor, such as a charge-coupled device (CCD) sensor and a complementary metal oxide semiconductor (CMOS) sensor, a video signal processor that performs analog-to-digital (A/D) conversion and a predetermined signal processing, and the like. A video captured in the imaging unit 101 is converted into still images (frame images) at predetermined time intervals and sent to the video transmitting unit 102. In the video transmitting unit 102, additional information, such as imaging apparatus information and time, is added to the received frame images, and then the frame images are converted into data transmittable over a network and transmitted to a video processing apparatus 200.

The video processing apparatus 200 includes a central processing unit (CPU) 11, a read only memory (ROM) 12, a random access memory (RAM) 13, a hard disk (HDD) 14, a display unit 15, an input interface (I/F) 16, and a communication unit 17. The CPU 11 reads a control program stored in the ROM 12 to perform various types of processing. The RAM 13 is used as a temporary storage area, such as a main memory or work area of the CPU 11. The HDD 14 stores various types of data, various programs, and the like. The display unit 15 displays various types of information. The display unit 15 may be a display device with an integrated touch panel. The input I/F 16 is an interface for inputting operation information for an operation apparatus 300. The communication unit 17 performs processing of communicating with an external apparatus, such as the imaging apparatus 100, over a network in a wired or wireless manner.

The functions and processing of the video processing apparatus 200, which are to be described below, are implemented by the CPU 11 reading a program stored in the ROM 12 or the HDD 14 and executing the program. As another example, the CPU 11 may read a program stored in a recording medium, such as a secure digital (SD) card, instead of the ROM 12.

In the present exemplary embodiment, while the video processing apparatus 200 performs each process of the flowcharts to be described below by a single processor (the CPU 11) using a single memory (the ROM 12), a different mode may be employed. For instance, the each process of the flowcharts to be described below can be performed by the cooperation of a plurality of processors or a plurality of RAMs, ROMs, and storages. A hardware circuit may be used to perform part of the processes. A processor other than the CPU may be used to implement the function or the processes (described below) of the video processing apparatus 200. (A graphics processing unit (GPU) may be used instead of the CPU.)

Next, a functional configuration of the video processing apparatus 200 will be described with reference to FIG. 1A. The video processing apparatus 200 has the following configuration.

A video receiving unit 201 receives frame images transmitted from the video transmitting unit 102 inside the imaging apparatus 100 via the communication unit 17, and transmits the received frame images to an image recording unit 202 and a human body detection and tracking unit 204. The image recording unit 202 converts the frame images, which result from the conversion at predetermined intervals and are sent from the video receiving unit 201, into a video in a predetermined format and records the video in a video recording unit 203.

The human body detection and tracking unit 204 performs a person detection process and a person tracking process with respect to a person in the frame images transmitted from the video receiving unit 201. In the person detection process, a method of detecting a person in an image is optional. Examples of the method includes a method of pattern matching of an edge and a personal shape in an image, a method using a convolutional neural network (CNN), and a background difference method. The person, who has been detected by the human body detection and tracking unit 204, is represented by the coordinates of two points located at the upper left corner and the lower right corner of a rectangle surrounding the person with the upper left corner of a frame image serving as the origin. The person tracking process is a process of associating persons detected in a plurality of images in a time direction with each other. Any method is used for the tracking process. For instance, the position of a person in a current frame image is estimated from the center position and the motion vector of a person included in the previous frame image, and the associating of the persons with each other is made based on the estimated position of the person and the center position of the person included in the current frame image. An identifier (ID) is assigned to the persons who are associated with each other, and such persons are treated as the very same person. Data (metadata) obtained in the human body detection and tracking unit 204 is output to a human body attribute detection unit 205 and further stored in a person information storage unit 206.

The human body attribute detection unit 205 performs, for each assigned personal ID, a human body attribute acquisition process and a personal behavior recognition process based on information (metadata) obtained in the human body detection and tracking unit 204. Herein, a human body attribute refers to a feature obtained mainly from the appearance of a person, such as an age, a gender, a height, a physique, a hairstyle feature, and a face feature. Behavior recognition refers to, for example, the detection of a behavior history of suspicious behaviors of a person and the acquisition of a degree of suspicious based on the detected history. In other words, a degree of a specified behavior as a suspicious behavior, or an extraordinary behavior (as a suspicious behavior), such as restlessly glancing around and rummaging a bag, is numerically expressed and acquired as the degree of suspicious.

The human body attribute detection unit 205 associates a behavior of a person, such as when the person stayed before the shelf, with a personal ID. In this regard, information about the shelf, such as with which imaging apparatus the shelf is imaged and at what coordinates on an image the shelf is located, is stored in a shelf position storage unit 211. Association of the information about the shelf with the person makes it possible to associate a product on the shelf with the personal ID.

The human body attribute detection unit 205 acquires not only information about shelves but also information about, for example, that a person has picked up a product, that a person has placed a product in a basket, and that a person has picked up a product, but returned the product to a shelf, as data about personal behavior. Such information can be extracted from an image and may be acquired by the method in which posture detection, posture estimation or the like is performed to detect that a person has touched a product. In addition to the method of acquiring such information from an image, the information may be acquired by the method in which a sensor is attached to a shelf to detect that a person has touched a product. Data (metadata) output by the human body attribute detection unit 205 is stored in the person information storage unit 206 together with the information output by the human body detection and tracking unit 204.

A video extraction unit 208 extracts a video that meets a condition from videos stored in the video recording unit 203, based on product information from a product information management unit 207 and information from the person information storage unit 206.

A candidate display unit 209 exerts control to display the video extracted in the video extraction unit 208 on the display unit 15.

An output unit 210 lumps stolen product information, a suspect, and suspect confirmation information together into a report and output the report.

The operation apparatus 300 includes a suspect information input unit 301 and an operation input unit 302. The suspect information input unit 301 inputs information about a suspect in theft through the operation by a user and sends the information to the video processing apparatus 200. The operation input unit 302 is used as an interface for operating the video processing apparatus 200. If the display unit 15 is a display apparatus equipped with a touch panel, the suspect information input unit 301 may be provided inside the video processing apparatus 200.

Next, processing that is performed by the imaging apparatus 100 in the present exemplary embodiment will be described using the flowchart of FIG. 2.

In step S101, the imaging unit 101 inside the imaging apparatus 100 captures a video and acquires frame images at a predetermined frame rate.

In step S102, the video transmitting unit 102 adds additional information, such as an imaging apparatus-specific number and time information, to the frame images acquired by the imaging unit 101, processes the frame images into images in a format allowing transmission over a network, and transmits the frame images to the video processing apparatus 200.

In step S103, the imaging apparatus 100 determines whether a request to end image transmission is issued. If the request to end is issued (YES, in step S103), the processing is ended. If the request to end is not issued (NO, in step S103), the processing returns to step S101 and frame images are acquired.

Next, recording and metadata storing processing performed by the video processing apparatus 200 according to the present exemplary embodiment will be described using the flowchart of FIG. 3.

In step S201, the video receiving unit 201 inside the video processing apparatus 200 receives the frame images sent from the imaging apparatus 100 and acquires frame images at a predetermined frame rate.

In step S202, the image recording unit 202 accumulates the frame images acquired by the video receiving unit 201 and stores the images in the video recording unit 203 as a video together with the added information, such as a time stamp and an imaging apparatus number.

In step S203, the human body detection and tracking unit 204 performs a detection process and a tracking process with respect to a human body in the frame images acquired by the video receiving unit 201. Further, the human body detection and tracking unit 204 generates metadata, such as rectangle coordinates on the image of a human body, as a human body detection result, and a personal ID or coordinates on an image, as a result of the tracking process.

In step S205, the human body detection and tracking unit 204 stores the metadata generated in step S203 in the person information storage unit 206. In addition, the human body attribute detection unit 205 stores metadata generated in step S204 in the person information storage unit 206. The operations in the above steps are performed each time a frame image is acquired. In step S206, the video receiving unit 201 determines whether reception of frame images has been terminated. If reception of frame images has been terminated (YES, in step S206), the processing is ended. If reception of frame images has not been terminated (NO, in step S206), the processing returns to step S201 and reception of frame images is performed.

In step S301, information about a person as an object of search (suspect in theft) is initially input from the operation apparatus 300 to the video extraction unit 208.

Figure 5:
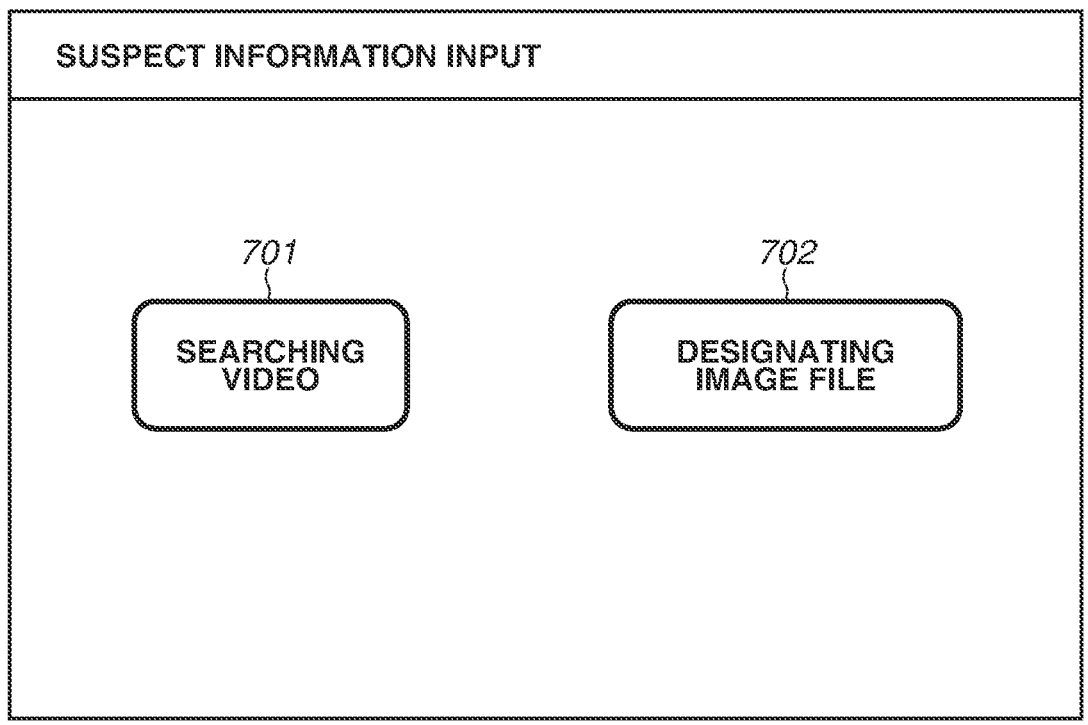
FIG. 5 is a diagram illustrating an example of a screen for selecting an image designation method in suspect information input.
Figure 6:
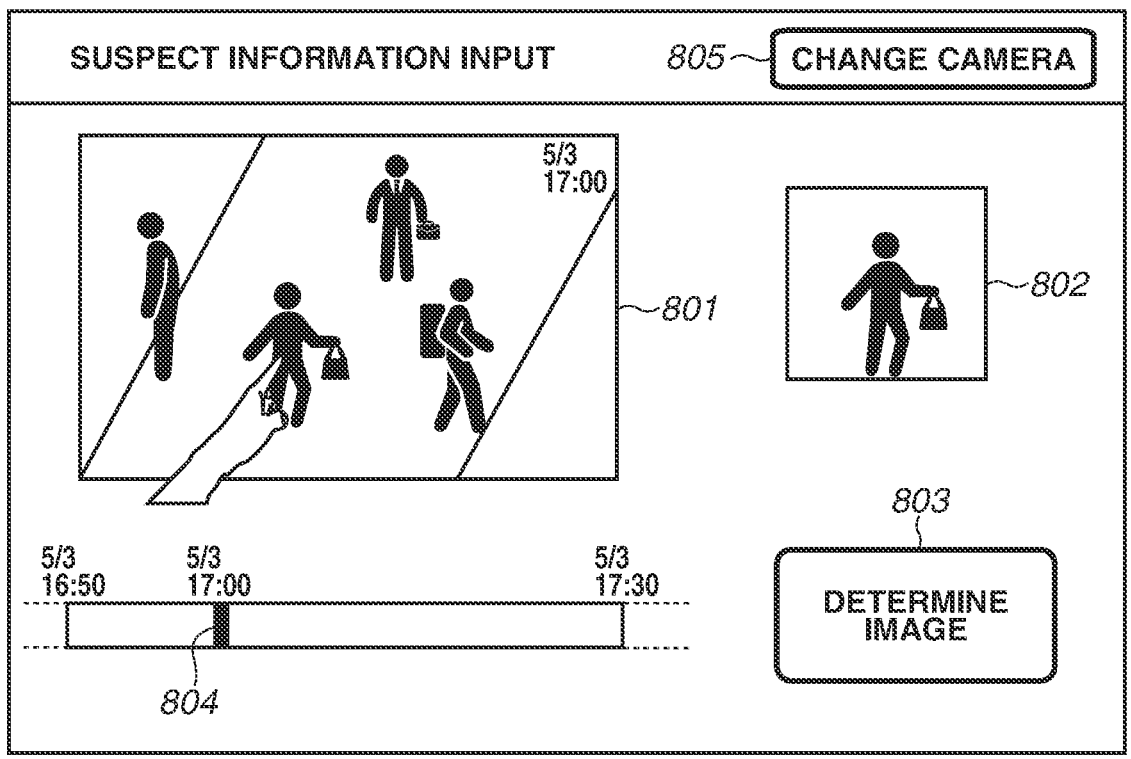
FIG. 6 is a diagram illustrating an example of a screen for selecting a suspect image in the suspect information input.
Figure 7:
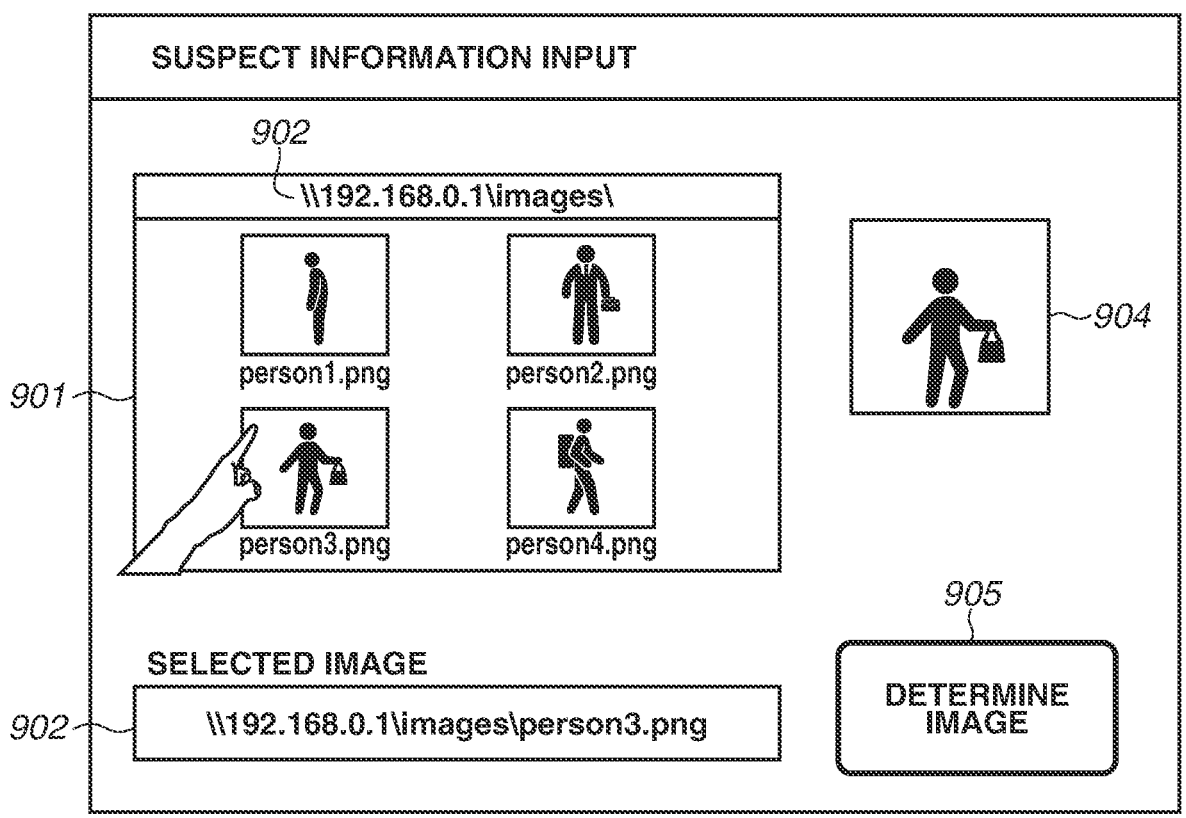
FIG. 7 is a diagram illustrating an example of the screen for selecting a suspect image in the suspect information input.

In the system according to the present exemplary embodiment, stolen product extraction processing starts from the input of information about a suspect in theft in step S301. The information about a suspect in theft is input from the suspect information input unit 301 through the operation of the operation apparatus 300 by a user. An example of a suspect information input screen is illustrated in FIGS. 5 through 7. In this example, suspect information is input by searching a video for a suspect to select the suspect or by designating an image file including a suspect. The screen illustrated in FIGS. 5 through 7 is displayed on the display unit 15 under the display control of the video extraction unit 208. If a user selects a button 701 in FIG. 5, the screen transfers to a screen for searching a video for a suspect to select the suspect (FIG. 6). If the user selects a button 702 in FIG. 5, the screen transfers to a screen for designating an image file including a suspect (FIG. 7).

In FIG. 6, when a user selects a suspect appearing in a video displaying part 801, an image of the selected suspect is displayed in a selected image displaying part 802. If the user selects an image determination button 803, the selected image is determined to be a suspect image and the suspect image is reported to the video extraction unit 208 as suspect information, and then the processing proceeds to the next step S302. If a video captured in a different period is to be checked, a period changing part 804 is operated to display the video captured in a different period in the video displaying part 801. If the user wants a video captured with a different camera to be displayed, change to the video captured with a different camera is carried out by selecting a camera changing button 805.

FIG. 7 is a diagram illustrating an example of a screen displayed in a suspect image designation method other than the method in FIG. 6. In FIG. 7, a user designates an image file including a suspect. In an image file list displaying part 901, a list of image files in a folder designated on an image folder path 902 is displayed. When the user selects a suspect, the file path of the selected image is displayed in a selected image file path displaying part 903 and the selected suspect image is displayed in a selected image displaying part 904. If an image determination button 905 is selected, the selected image is determined to be a suspect image and the suspect image is reported to the video extraction unit 208 as suspect information. The processing then proceeds to the next step S302.

In step S302, the video extraction unit 208 extracts the characteristic amount of the face from the suspect image received in step S301 and collates the extracted characteristic amount of the face with the characteristic amount of the face in each piece of person information stored in the person information storage unit 206. As a result of the collation, a piece of person information that is successful in collation is treated as the person information for the suspect. Since the person information contains information about the position of a person at each time, such a process allows the user to know when the suspect is at which position.

In step S303, the video extraction unit 208 acquires product information from the product information management unit 207 and takes the product in question as a candidate product for stolen product if there is inconsistency in the sum of the quantity of stock, the quantity of sales, and the quantity of disposal of the product. A method of determining a candidate product for stolen product is described with reference to FIGS. 8 and 9.

FIGS. 8 and 9 illustrate examples of product information acquired from the product information management unit 207. The illustrated examples are examples of product information for the same product at different dates and times. The product information includes the placement in a store (store shelf number), the quantity of stock, the quantity of sales, the quantity of disposal, and the like. FIG. 8 illustrates the information at the arrival of the product, from which it is seen that the quantity of stock is 100, the quantity of sales is 0, and the quantity of disposal is 0, so that the sum of the quantity of stock, the quantity of sales, and the quantity of disposal is 100. FIG. 9 illustrates the latest information about the product, from which it is seen that the quantity of stock is 10, the quantity of sales is 89, and the quantity of disposal is 0, so that the sum of the quantity of stock, the quantity of sales, and the quantity of disposal is 99. In other words, the product has been lost by one in a period from the time of the product information in FIG. 8 to the time of the product information in FIG. 9, so that there is inconsistency in the sum of the quantity of stock, the quantity of sales, and the quantity of disposal of the product. The video extraction unit 208 determines such a product with inconsistency to be a candidate product for stolen product. The quantity of stock may be updated not only during the inventory by the store staff but by counting with a sensor provided on a store rack or counting products from a video captured with a monitor camera.

In step S304, the video extraction unit 208 makes a comparison between the person information for the suspect acquired in step S302 and the product determined in step S303 to be a candidate product for stolen product. If a period of time during which the suspect approached the shelf on which the candidate product for stolen product is arranged (or the product on the shelf) is found as a result of the comparison, a video captured in the period is extracted from the video recording unit 203.

Figure 10:
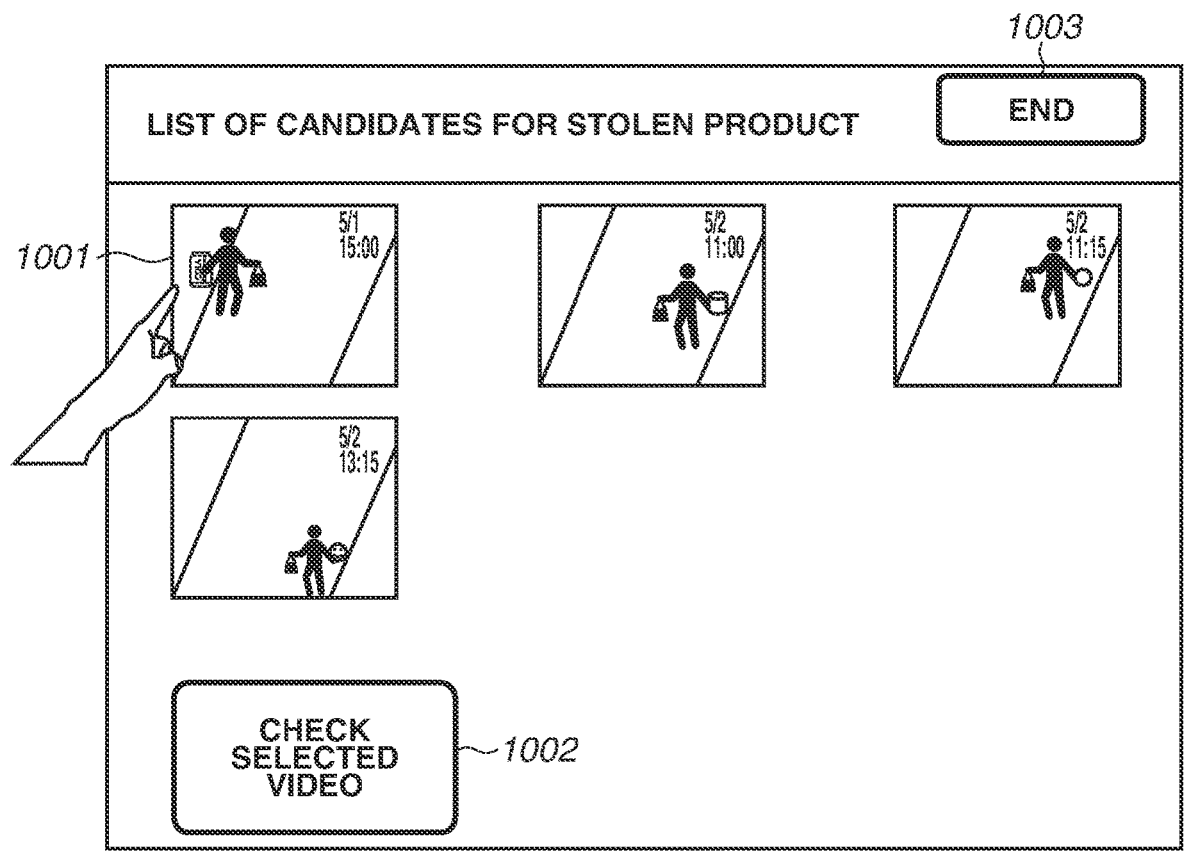
FIG. 10 is a diagram illustrating an example of a list screen of candidates for stolen product.

In step S305, the candidate display unit 209 displays the video extracted by the video extraction unit 208 in step S304 on the display unit 15. An example of the display of extracted videos is illustrated in FIG. 10. In the example in FIG. 10, four videos 1001 are extracted, in each of which the suspect has approached the candidate product for stolen product. When a user selects a video that the user wants to check and selects a selected video check button 1002, a screen illustrated in FIG. 10 transfers to a screen illustrated in FIG. 11 as an example of a screen involved with the selected video.

Figure 11:
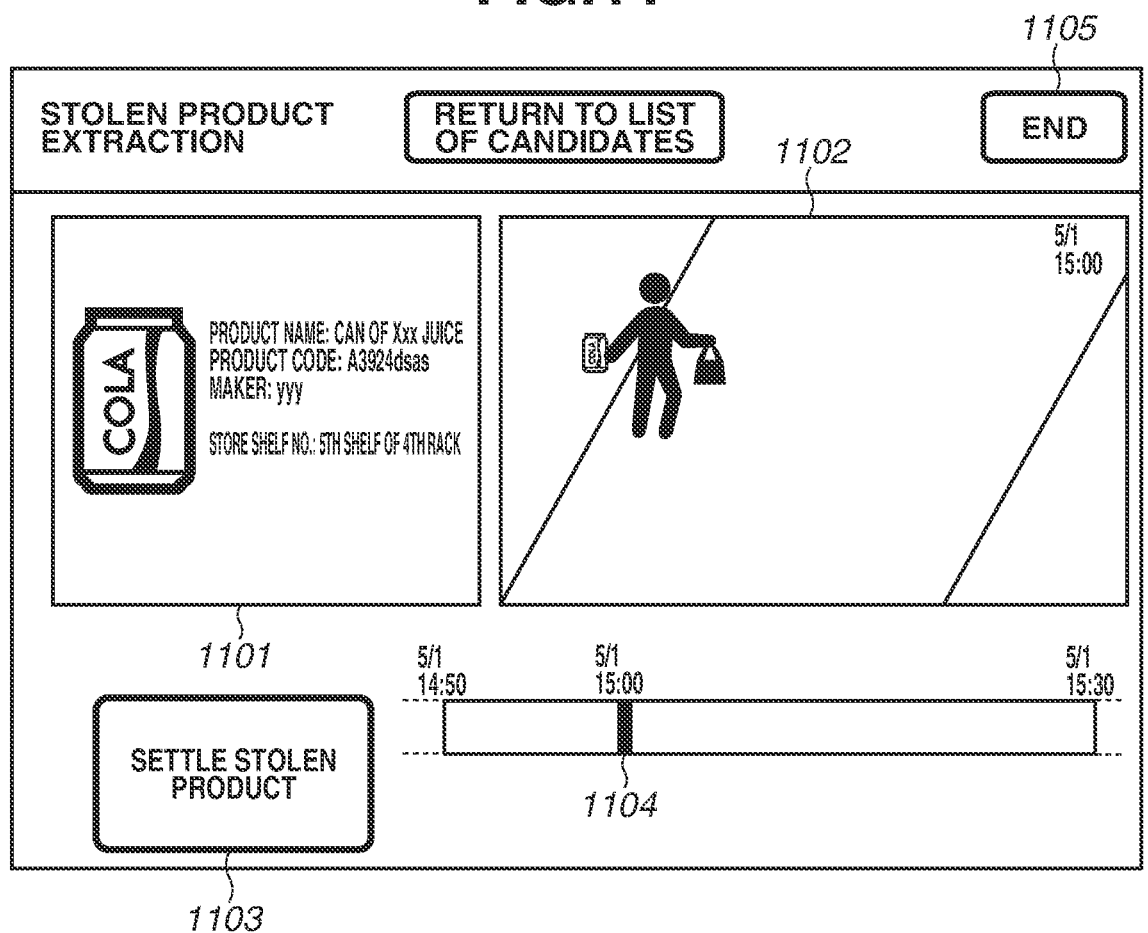
FIG. 11 is a diagram illustrating an example of a stolen product confirmation screen.

FIG. 11 is a diagram illustrating an example of a screen for checking a video, in which the suspect has approached the candidate product for stolen product. In the example in FIG. 11, the product information is displayed in a product information displaying part 1101. In a video displaying part 1102, a video captured when the suspect is approaching the candidate product for stolen product is displayed. In a case where a video captured in a different period is to be checked, a period changing part 1104 is operated to display the video captured in a different period in the video displaying part 1102. If a theft is confirmed and the user selects a stolen product settling button 1103, the candidate product for stolen product is registered as a stolen product, and the suspect information and the video, in which the suspect has approached the product in question, are registered as information for report, then the screen transfers to the screen illustrated in FIG. 10.

In step S306, the processing is in a standby state waiting for an operation by the user. If the stolen product settling button 1103 is not selected but an end button 1003 in FIG. 10 or an end button 1105 in FIG. 11 is selected, the processing is ended. If the end of the processing is not instructed, the processing returns to step S305 and is continued. In contrast, if the stolen product settling button 1103 is selected and, in the state in which the stolen product has been settled, the end button 1003 in FIG. 10 or the end button 1105 in FIG. 11 is selected, the processing proceeds to step S307. In step S307, the output unit 210 performs a suspect report making process.

Figure 12:
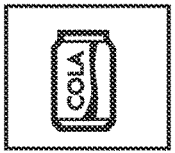
FIG. 12 is a diagram illustrating an example of a stolen product report screen.

Next, the suspect report making process in step S307 will be described with reference to FIG. 12. FIG. 12 is a diagram illustrating an example of suspect report information, and the suspect report information is displayed on the display unit 15 based on the result of the foregoing processing. In a stolen product information displaying part 1201, information about the settled stolen product is displayed along with the product information retrieved from the product information management unit 207. In a suspect information displaying part 1202, information about the designated suspect is displayed. In a suspect image displaying part 1203, a thumbnail image of the specified suspect is displayed. In a suspect feature displaying part 1204, external features of the suspect are displayed. The external features are displayed based on metadata information prepared by the human body attribute detection unit 205. In a suspect confirmation image displaying part 1205, part of a video recorded when the suspect has approached the stolen product is displayed. In a confirmation image information displaying part 1206, the recording time and place, which are information added to the image, and store rack information associated with the person information as well are displayed. A supplementary information displaying part 1207 is a space utilized for adding supplementary information or any comment to the suspect report. For this suspect report information, while product information and suspect information are extracted, a user can operate the operation apparatus 300 to add further information. In step S307, if a user selects a printing button 1208 in the state in which the suspect report information illustrated in FIG. 12 is displayed on the display unit 15, the output unit 210 instructs an external printing device (not illustrated) to print the report. If a navigation button 1209 is selected, it is possible to transfer to a stolen product information input page, for instance, so as to return to the specification of a suspect with respect to the next stolen product.

As described above, in the system according to the present exemplary embodiment, a video is recorded and, at the same time, metadata obtained by the human body attribute detection is stored, and suspect information is input, so that a list of candidate products for stolen product is created. This makes it possible to quickly and easily specify another product stolen by the suspect. This enables a user to quickly and easily specify another stolen product to make a report.

Subsequently, a second exemplary embodiment of the present disclosure will be described. The second exemplary embodiment is similar in configuration to the first exemplary embodiment, so that the differences are to be described.

Figure 13:
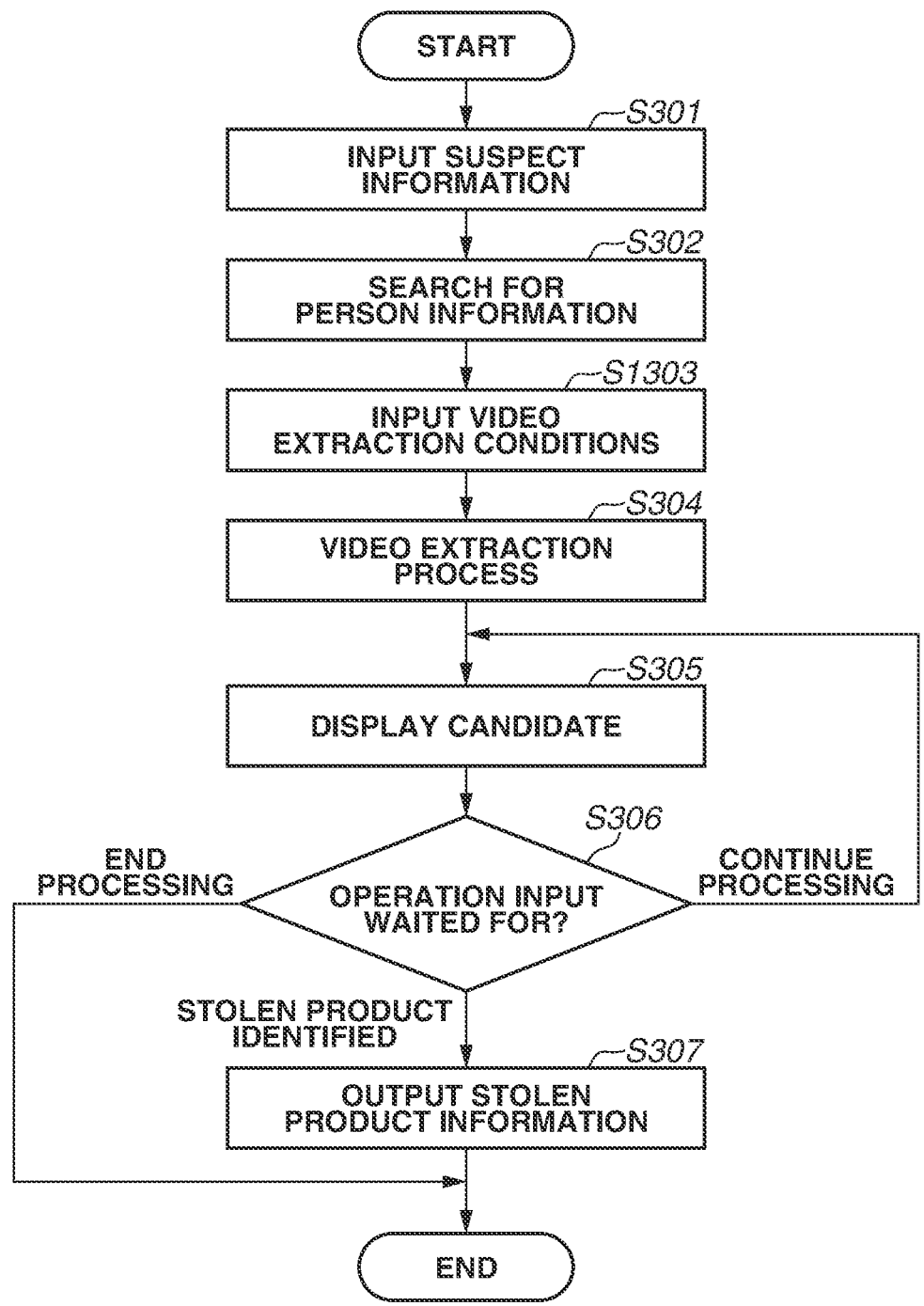
FIG. 13 is a flowchart illustrating an example of the stolen product extraction processing procedure.
Figure 14:
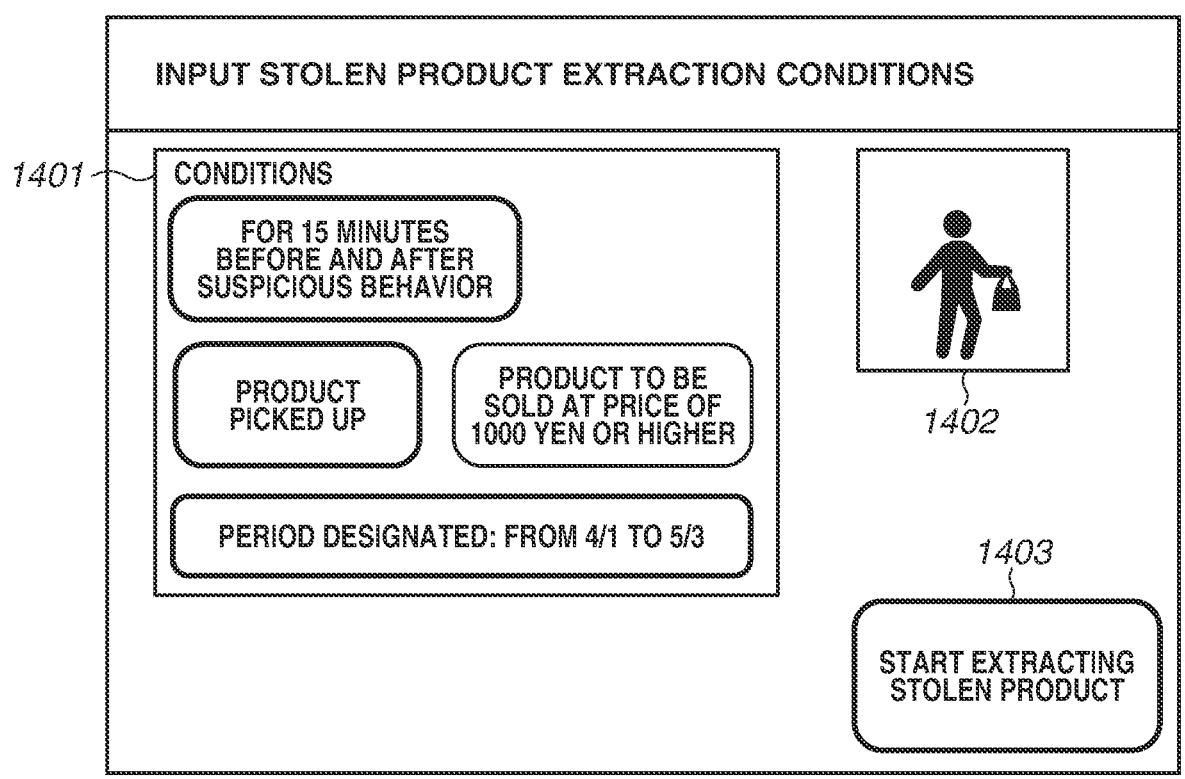
FIG. 14 is a diagram illustrating an example of a stolen product extraction condition input screen.

A description will be provided of stolen product extraction processing which is performed by the video processing apparatus 200 according to the present exemplary embodiment, with reference to a flowchart of FIG. 13 and a diagram of FIG. 14. To steps in FIG. 13 for operations that are the same as those in FIG. 4, the same reference signs are assigned, and the description thereof is omitted.

In step S1303, the video extraction unit 208 inputs video extraction conditions from the operation apparatus 300 through the operation by a user. An example of a screen for inputting video extraction conditions is illustrated in FIG. 14. A user selects a condition that the user wants to use for video extraction from among those in an extraction condition part 1401 of the screen illustrated in FIG. 14. The selected conditions are indicated in thick-bordered boxes. In the example in FIG. 14, a video in which a suspect picked up a product is extracted for 15 minutes before and after the time when a suspicious behavior of the suspect is detected, during a period designated. In a selected image displaying part 1402, the suspect image selected in step S301 is displayed. If the user selects a stolen product extraction starting button 1403, a video that meets the conditions in the extraction condition part 1401 is extracted from among the selected videos of the suspect. A list of extracted videos is displayed as illustrated in FIG. 10.

Other Embodiments

The present disclosure can be implemented by the processing, in which a program for implementing one or more functions of the exemplary embodiments as above is supplied to a system or an apparatus over a network or through a storage medium, and one or more processors in a computer of the system or apparatus read and execute the program. The present disclosure can also be implemented by a circuit (application-specific integrated circuit (ASIC), for instance) that implements one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-112960, filed Jun. 30, 2020, which is hereby incorporated by reference herein in its entirety.

What is claimed is:

1. An image processing apparatus comprising:
   one or more memories storing instructions;
   one or more processors that, upon execution of the stored instructions, configures the one or more processors to:
   determine, based on a selection input by a user, a person to be retrieved among at least one person detected from a video image that was previously captured and stored on a storage device;
   obtain, for the determined person, person information including a behavior history of the determined person and position information of the determined person at each time the determined person is detected within the video image;
   specify a specific product having inconsistency in a sum of a quantity of stock, a quantity of sales, and a quantity of disposal between an initial time and a time at which the stored video image was captured;
   obtain, product information identifying placement of the specific product;
   extract, based on the person information and the product information, from the stored video image, at least one image that includes the determined person and the specific product and when the position information determined of the person indicates the determined person approaches the specific product; and
   control a display to display the at least one image extracted from the stored video image.

2. The image processing apparatus according to claim 1, wherein execution of the stored instructions further configures the one or more processors to store a behavior history for each detected person in a storage.

3. The image processing apparatus according to claim 1, wherein the person to be retrieved is determined by a user designation.

4. The image processing apparatus according to claim 1, wherein the person to be retrieved is a suspect thief, and wherein the specific product is a product with a possibility of having been stolen by the suspect thief.

5. The image processing apparatus according to claim 4, wherein execution of the stored instructions further configures the one or more processors to accept an input, by a user based on the at least one image displayed on the display, for confirming, as a stolen product, the specific product with a possibility of having been stolen by the suspect thief.

6. The image processing apparatus according to claim 5, wherein execution of the stored instructions further configures the one or more processors to control the display to display a report including the person information related to the person to be retrieved and the product information related to the specific product in a case where the input for confirming, as the stolen product, the specific product with the possibility of having been stolen by the suspect thief is accepted.

7. The image processing apparatus according to claim 1, wherein execution of the stored instructions further configures the one or more processors to:
   cause the video image to be displayed; and
   accept an input for designating the person to be retrieved from the displayed video image by a user.

8. The image processing apparatus according to claim 1, wherein the at least one image including the person to be retrieved who has approached the specific product is extracted based on the behavior history of the person to be retrieved and the product information.

9. The image processing apparatus according to claim 1, wherein the at least one image including the person to be retrieved who has touched the specific product is extracted based on the behavior history of the person to be retrieved and the product information.

10. The image processing apparatus according to claim 1, wherein execution of the stored instructions further configures the one or more processors to accept an input to designate a period for searching the video image, and wherein the at least one image is extracted from the video image during the period.

11. The image processing apparatus according to claim 1, wherein execution of the stored instructions further configures the one or more processors to obtain, as the person information, a result of detection and tracking of a person from the video image, and a human body attribute relating to an appearance of the person.

12. The image processing apparatus according to claim 1, wherein the product information includes at least one of information indicating a placement in a store, information indicating a quantity of stock, information indicating a quantity of sales, and information indicating a quantity of disposal.

13. An image processing method comprising:
- determining, based on a selection input by a user, a person to be retrieved among at least one person detected from a video image that was previously captured and stored on a storage device;
- obtaining, for the determined person, person information including a behavior history of the determined person and position information of the determined person at each time the determined person is detected within the video image;
- specifying a specific product having inconsistency in a sum of a quantity of stock, a quantity of sales, and a quantity of disposal between an initial time and a time at which the stored video image was captured;
- obtaining product information identifying a placement of the specific product;
- extract, based on the person information and the product information, from the stored video image, at least one image that includes the determined person and the specific product and when the position information of the determined person indicates the determined person approaches the specific product; and
- controlling a display to display the at least one image extracted from the stored video image.

14. A non-transitory computer readable storage medium storing a program for causing a computer to perform an image processing method comprising:
- determining, based on a selection input by a user, a person to be retrieved among at least one person detected from a video image that was previously captured and stored on a storage device;
- obtaining, for the determined person, person information including a behavior history of the determined person and position information of the determined person at each time the determined person is detected within the video image;
- specifying a specific product having inconsistency in a sum of a quantity of stock, a quantity of sales, and a quantity of disposal between an initial time and a time at which the stored video image was captured;
- obtaining product information identifying a placement of the specific product;
- extract, based on the person information and the product information, from the stored video image, at least one image that includes the determined person and the specific product and when the position information of the determined person indicates the determined person approaches the specific product; and
- controlling a display to display the at least one image extracted from the stored video image.

* * * * *